US011929196B2

(12) United States Patent
Yen et al.

(10) Patent No.: US 11,929,196 B2
(45) Date of Patent: Mar. 12, 2024

(54) METHOD OF MAKING SLOW WAVE INDUCTIVE STRUCTURE

(71) Applicant: TAIWAN SEMICONDUCTOR MANUFACTURING COMPANY, LTD., Hsinchu (TW)

(72) Inventors: Hsiao-Tsung Yen, Hsinchu (TW); Cheng-Wei Luo, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 21 days.

(21) Appl. No.: 17/395,122

(22) Filed: Aug. 5, 2021

(65) Prior Publication Data

US 2021/0366643 A1 Nov. 25, 2021

Related U.S. Application Data

(62) Division of application No. 16/048,030, filed on Jul. 27, 2018, now Pat. No. 11,101,061, which is a division of application No. 14/039,024, filed on Sep. 27, 2013, now Pat. No. 10,510,476.

(51) Int. Cl.
*H01F 21/12* (2006.01)

(52) U.S. Cl.
CPC ....... *H01F 21/12* (2013.01); *H01F 2021/125* (2013.01)

(58) Field of Classification Search
CPC ........................... H01F 2021/125; H01F 21/12
See application file for complete search history.

(56) References Cited

U.S. PATENT DOCUMENTS

| | | | | |
|---|---|---|---|---|
| 4,959,631 | A | 9/1990 | Hasegawa et al. | |
| 6,992,366 | B2 | 1/2006 | Kim et al. | |
| 10,283,257 | B2 * | 5/2019 | Kim | H01F 27/2804 |
| 10,505,512 | B2 * | 12/2019 | Choi | H03H 7/38 |
| 2004/0075523 | A1 | 4/2004 | Shimazawa et al. | |
| 2008/0303622 | A1 * | 12/2008 | Park | H01F 17/0013 336/200 |
| 2012/0274434 | A1 | 11/2012 | Lim et al. | |
| 2012/0319237 | A1 | 12/2012 | Cooney, III | |
| 2018/0350502 | A1 | 12/2018 | Yen et al. | |
| 2021/0366643 | A1 * | 11/2021 | Yen | H01F 21/12 |

* cited by examiner

*Primary Examiner* — Minh N Trinh
(74) *Attorney, Agent, or Firm* — Hauptman Ham, LLP

(57) ABSTRACT

A method of making a slow wave inductive structure includes depositing a first dielectric layer over a first substrate. The method further includes forming a first conductive winding in the first dielectric layer. The method further includes bonding a second substrate to the first dielectric layer, wherein the second substrate is physically separated from the first conductive winding, and the second substrate has a thickness ranging from about 50 nanometers (nm) to about 150 nm. The method further includes depositing a second dielectric layer over the second substrate. The method further includes forming a second conductive winding in the second dielectric layer, wherein the second substrate is physically separated from the second conductive winding.

20 Claims, 8 Drawing Sheets

METHOD OF MAKING SLOW WAVE INDUCTIVE STRUCTURE

PRIORITY CLAIM AND RELATED APPLICATION

This application is a divisional of U.S. application Ser. No. 16/048,030, filed Jul. 27, 2018, which is a divisional of U.S. application Ser. No. 14/039,024, filed Sep. 27, 2013, now U.S. Pat. No. 10,510,476, issued Dec. 17, 2019, which are herein incorporated by reference in their entirety. This application is related to U.S. application Ser. No. 16/689,633, filed Nov. 20, 2019, which are herein incorporated by reference in their entireties.

BACKGROUND

Inductors are used in circuits to help regulate current flow through the circuit. When a current flows through the inductor, energy is stored temporarily in a magnetic field in the inductor. When the current flowing through the inductor changes, a time-varying magnetic field within the inductor induces a voltage in the inductor which opposes the change in current that created the magnetic field.

A transformer is a static electrical device that transfers energy by inductive coupling between winding circuits. A varying current in a primary winding creates a varying magnetic flux in a core of the transformer and varies a magnetic flux through a secondary winding. The varying magnetic flux induces a varying voltage in the secondary winding.

As technology nodes shrink, circuit sizes are reduced. Inductors or transformers occupy a large area in a circuit design. As the circuit size decreases, proximity between the inductor or transformer and the other devices increases. Further, as metal lines in these components decrease in size, a resistance in the metal lines increases. The increased resistance in turn lowers the quality (Q) factor of the inductors and transformers. In addition, inductors and transformers cause a magnetic flux to pass through the circuit. The magnetic flux is capable of introducing noise into other devices within the circuit.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are examples and are not intended to be limiting.

Figure 1A:
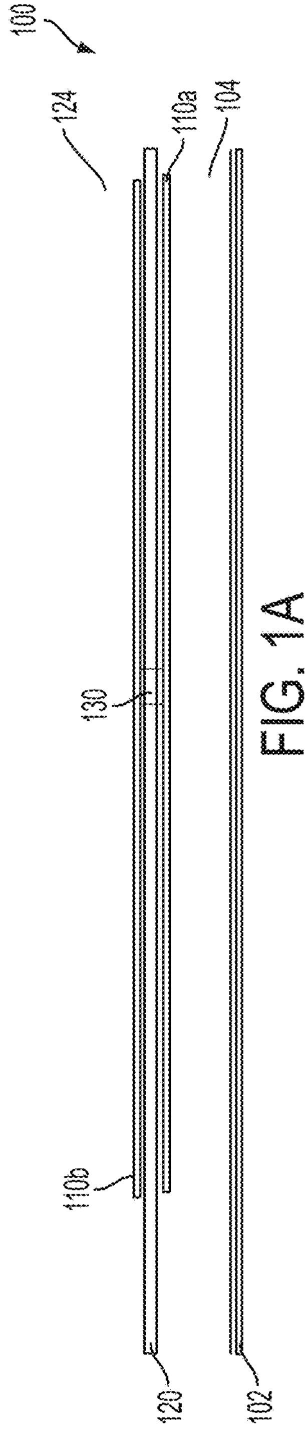
FIG. 1A is a cross sectional view of a slow wave inductive structure in accordance with one or more embodiments.

FIG. 1A is a cross sectional view of a slow wave inductive structure 100 in accordance with one or more embodiments. Slow wave inductive structure 100 includes a first substrate 102 and a first inter-metal dielectric (IMD) layer 104 over the first substrate. Slow wave inductive structure 100 includes a first conductive winding 110*a* in first IMD layer 104. A second substrate 120 is over first IMD layer 104 and over first conductive winding 110*a*. A second IMD layer 124 is over second substrate 120. A second conductive winding 110*b* is in second IMD layer 124. A conductive line 130 electrically connects first conductive winding 110*a* to second inductive winding 110*b* through second substrate 120.

In some embodiments, first substrate 102 includes an elementary semiconductor including silicon or germanium in crystal, polycrystalline, or an amorphous structure; a compound semiconductor including silicon carbide, gallium arsenic, gallium phosphide, indium phosphide, indium arsenide, and indium antimonide; an alloy semiconductor including SiGe, GaAsP, AlInAs, AlGaAs, GaInAs, GaInP, and GaInAsP; any other suitable material; or combinations thereof. In some embodiments, the alloy semiconductor substrate has a gradient SiGe feature in which the Si and Ge composition change from one ratio at one location to another ratio at another location of the gradient SiGe feature. In some embodiments, the alloy SiGe is formed over a silicon substrate. In some embodiments, first substrate 102 is a strained SiGe substrate. In some embodiments, the semiconductor substrate has a semiconductor on insulator structure, such as a silicon on insulator (SOI) structure. In some embodiments, the semiconductor substrate includes a doped epi layer or a buried layer. In some embodiments, the compound semiconductor substrate has a multilayer structure, or the substrate includes a multilayer compound semiconductor structure. In some embodiments, a thickness of first substrate ranges from about 30 microns (μm) to about 50 μm.

First IMD layer 104 is a multi-layer material having conductive lines extending in a plane parallel to a top surface of first substrate 102 in each layer and conductive vias connecting conductive lines on separate layers in the first IMD layer. First IMD layer 104 includes a dielectric material configured to insulate the conductive lines and conductive vias. In some embodiments, first IMD layer 104 includes an interconnect structure configured to electrically connect active devices in or on first substrate 102. In some embodiments, the dielectric material of first IMD layer 102 includes a low-k dielectric material. A low-k dielectric material has a dielectric constant less than that of silicon dioxide.

First conductive winding 110*a* includes conductive lines in first IMD layer 104. In some embodiments, first conductive winding 110*a* is in a two-dimensional plane in first IMD layer 104. In some embodiments, first conductive winding 110*a* is a three-dimensional structure in first IMD layer 104. The three-dimensional structure includes a combination of conductive lines on different layers of first IMD layer 104 and conductive vias connecting the conductive lines. In some embodiments, first conductive winding 110*a* includes a single port for either receiving or outputting an electrical current. In some embodiments, first conductive winding 110*a* includes more than one port and is capable of both receiving and outputting an electrical current. In some embodiments, first conductive winding 110*a* includes copper, aluminum, nickel, tungsten, titanium, or another suitable conductive material. In some embodiments, first conductive winding is omitted and slow wave inductive structure 100 includes only second conductive winding 110*b*.

In some embodiments, first conductive winding 110*a* is a meandering type winding in which a conductive line extends along an angled direction with respect to an x-axis and a y-axis of first IMD layer 104. Conductive lines in a same layer of first IMD layer 104 extend parallel to one another. Conductive lines in a different layer of first IMD layer 104 are arranged to allow electrical connection between the parallel conductive lines; and conductive vias connect the conductive lines on the different layers of the first IMD layer.

In some embodiments, first conductive winding 110*a* is a spiral type winding in which conductive lines are arranged in a spiral arrangement in different layers of first IMD layer 104. Conductive vias provide electrical connections between the conductive lines in the different layers of first IMD layer 104.

Second substrate 120 is used to reduce a speed of a current through first conductive winding 110*a* or second conductive winding 110*b*. Second substrate 120 is capable of reducing the speed of the current through first conductive winding 110*a* or second conductive winding 110*b* due to the conductivity of the second substrate. A magnetic field generated by passing the current through first conductive winding 110*a* or second conductive winding 110*b* induces a current within second substrate 120 which slows the propagation of waves through the first conductive winding or the second conductive winding. In some embodiments, second substrate 120 includes polysilicon, doped silicon, or other suitable conductive materials.

In some embodiments, a thickness of second substrate 120 ranges from about 50 nanometers (nm) to about 150 nm. In some embodiments, the thickness of second substrate 120 ranges from about 150 nanometers (nm) to about 450 nm. In some embodiments, the thickness of second substrate 120 ranges from about 450 nanometers (nm) to about 850 nm. If the thickness of second substrate 120 is too great, forming conductive line 130 becomes difficult and the length of the ILV unnecessarily increases resistance in slow wave inductive structure 100, in some embodiments. If the thickness of second substrate 120 is too small, the second substrate does not sufficiently reduce the speed of the wave propagating through first conductive winding 110*a* or second conductive winding 110*b*, in some embodiments.

In some embodiments, a separation between first conductive winding 110*a* and second substrate 120 ranges from about 500 nm to about 1 μm. In some embodiments, the separation between first conductive winding 110*a* and second substrate 120 ranges from about 1 μm to about 2 μm. In some embodiments, the separation between first conductive winding 110*a* and second substrate 120 ranges from about 2 μm to about 5 μm. In some embodiments, the separation between first conductive winding 110*a* and second substrate 120 ranges from about 5 μm to about 15 μm. If the separation is too great, the magnetic field generated by passing current through first conductive winding 110*a* is too weak to generate the current in second substrate 120 to slow the propagation of the wave in the first conductive winding, in some embodiments. If the separation is too small, first IMD layer 104 is not able to provide sufficient insulation between first conductive winding 110*a* and second substrate 120, in some embodiments.

By slowing the propagation of the wave through first conductive winding 110*a* or second conductive winding 110*b*, an inductance strength of slow wave inductive structure 100 is increased without increasing a size of the first conductive winding or the second conductive winding. In comparison with an arrangement which does not include second substrate 120, slow wave inductive structure 100 provides a same inductance while occupying a smaller area in the circuit. The smaller area helps to facilitate reducing an overall size of the circuit.

Second IMD layer 124 includes a dielectric material and conductive lines and conductive vias. Second IMD layer 124 is a multi-layer material having conductive lines extending in a plane parallel to a top surface of second substrate 120 in each layer and conductive vias connecting conductive lines on separate layers in the first IMD layer. In some embodiments, second IMD layer 124 includes an interconnect structure configured to electrically connect active devices in or on second substrate 120. The dielectric material in second IMD layer 124 is used to provide insulation between adjacent conductive lines or conductive vias. In some embodiments, the dielectric material of second IMD layer 124 includes a low-k dielectric material. In some embodiments, the dielectric material of second IMD layer 124 is a same dielectric material as first IMD layer 104. In some embodiments, the dielectric material of second IMD layer 124 is different from the dielectric material of first IMD layer 104.

In some embodiments, a separation between second conductive winding 110*b* and second substrate 120 ranges from about 1 μm to about 2 μm. If the separation is too great, the magnetic field generated by passing current through second conductive winding 110*b* is too weak to generate the current in second substrate 120 to slow the propagation of the wave in the second conductive winding, in some embodiments. If the separation is too small, second IMD layer 124 is not able to provide sufficient insulation between second conductive winding 110*b* and second substrate 120, in some embodiments. In some embodiments, the separation between first conductive winding 110*a* and second substrate 120 is equal to the separation between second conductive winding 110*b* and the second substrate. In some embodiments, the separation between first conductive winding 110*a* and second substrate 120 is different from the separation between second conductive winding 110*b* and the second substrate.

Second conductive winding 110*b* includes conductive lines in second IMD layer 124. In some embodiments, second conductive winding 110*b* is in a two-dimensional plane in second IMD layer 124. In some embodiments, second conductive winding 110*b* is a three-dimensional structure in second IMD layer 124. In some embodiments, second conductive winding 110*b* includes a single port for either receiving or outputting an electrical current. In some embodiments, second conductive winding 110*b* includes more than one port and is capable of both receiving and outputting an electrical current. In some embodiments, second conductive winding 110*b* includes copper, aluminum, nickel, tungsten, titanium, or another suitable conductive material. In some embodiments, second conductive winding 110*b* is omitted and slow wave inductive structure 100 includes only first conductive winding 110*a*. In some embodiments, a shape of second conductive winding 110*b* is a same shape as first conductive winding 110*a*. In some embodiments, the shape of second conductive winding is different from first conductive winding 110*a*.

Conductive line 130 is used to electrically connect first conductive winding 110*a* to second conductive winding 110*b*. Conductive line 130 extends through second substrate 120. In some embodiments, conductive line 130 is a metal line, a via, a through silicon via (TSV), an inter-level via (ILV), or another suitable conductive line. In some embodiments, conductive line 130 includes copper, aluminum, nickel, titanium, tungsten or other suitable conductive material. In some embodiments, conductive line 130 is a same material as first conductive winding 110*a* and second conductive winding 110*b*. In some embodiments, conductive line 130 is a different material from first conductive winding 110*a* or second conductive material 110*b*. In some embodiments where slow wave inductive structure 100 is a transformer, conductive line 130 is omitted to prevent direct electrical connection between first conductive winding 110*a* and second conductive winding 110*b*.

Figure 1B:
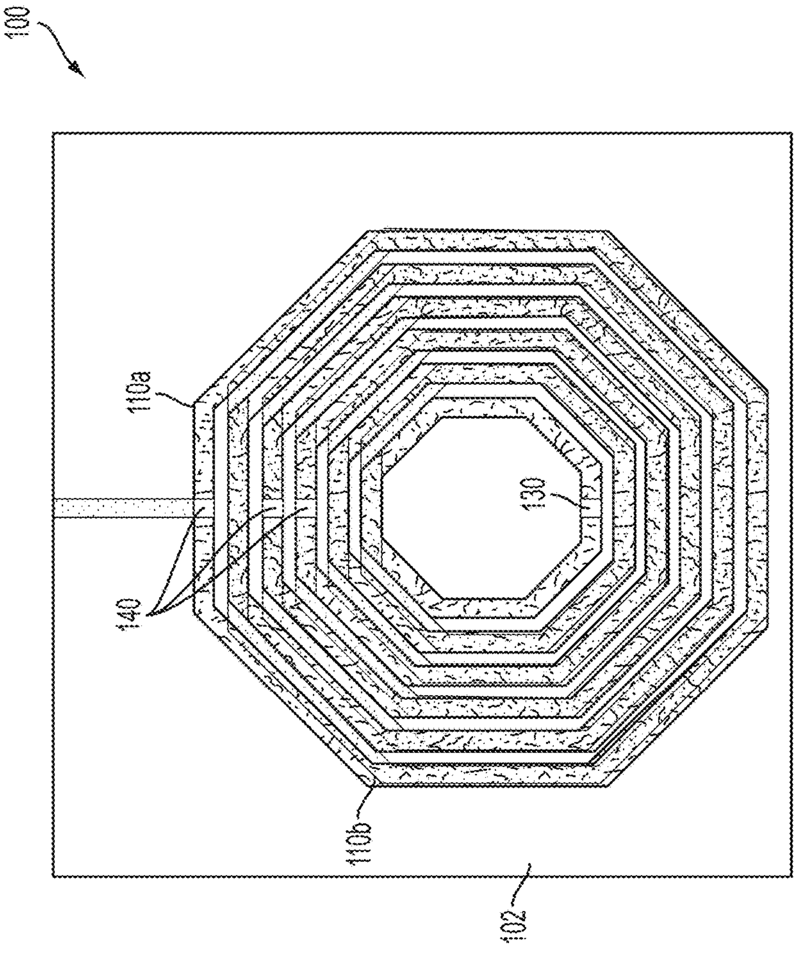
FIG. 1B is a top view of a slow wave inductive structure in accordance with one or more embodiments.

FIG. 1B is a top view of slow wave inductive structure 100 in accordance with one or more embodiments. The top view includes switches 140 which are formed in second substrate 120 to selective connect different portions of first conductive winding 110*a* and second conductive winding 110*b*. In some embodiments, switches 140 are transistors, such as metal-oxide-semiconductor (MOS) transistors, bipolar junction transistors (BJTs), high electron mobility transistors (HEMTs), or other suitable switching elements. By independently activating switches 140, an inductance and Q factor of slow wave inductive structure 100 is adjustable. In some embodiments, switches 140 are activated based on control signals received from a controller. In some embodiments, the control signals are generated in response to a user input. In some embodiments, the control signals are generated automatically in response to a detected current change. In some embodiments in which switches 140 are transistors, the control signal is applied to a gate of the switch to selectively active the switch.

Figure 2A:
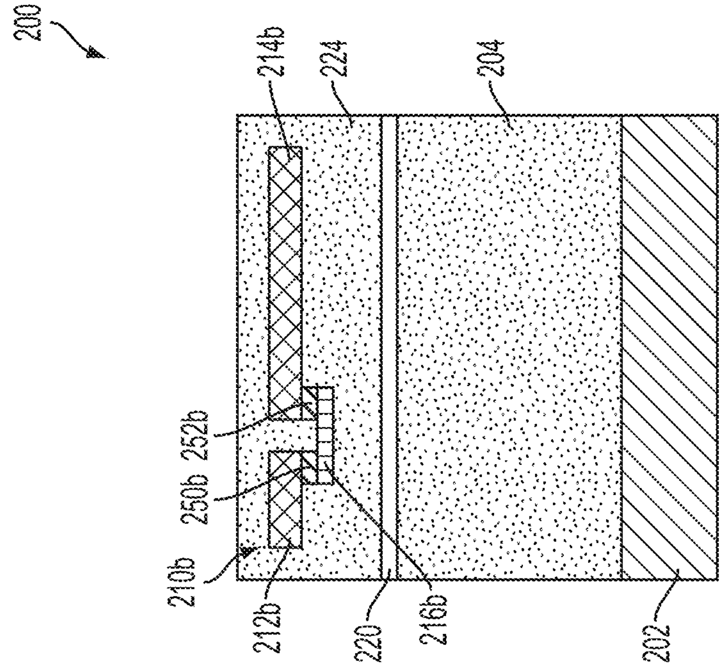
FIG. 2A is a cross sectional view of a slow wave inductor in accordance with one or more embodiments.

FIG. 2A is a cross sectional view of a slow wave inductor 200 in accordance with one or more embodiments. Slow wave inductor 200 is similar to slow wave inductive structure 100 (FIG. 1A). Similar elements have a same reference number increased by 100. Slow wave inductor 200 includes conductive winding 210*b* only in second IMD layer 224. The presence of second substrate 220 helps to slow a propagation of a wave through conductive winding 210*b*. In comparison with approaches which do not include second substrate 220, a size of conductive winding 210*b* is reduced while strength of inductance is maintained. In some embodiments, a separation between conductive winding 210*b* and second substrate 220 ranges from about 1 μm to about 2 μm.

Conductive winding 210*b* includes a first conductive line 212*b* and a second conductive line 214*b* on a same level of second IMD layer 224. Conductive winding 210*b* further includes a third conductive line 216*b* on a different level of second IMD layer 224. Conductive winding 210*b* further includes a first conductive via 250*b* connecting first conductive line 212*b* to third conductive line 216*b*; and a second conductive via 252*b* connecting second conductive line 214*b* to third conductive line 216*b*.

Figure 2B:
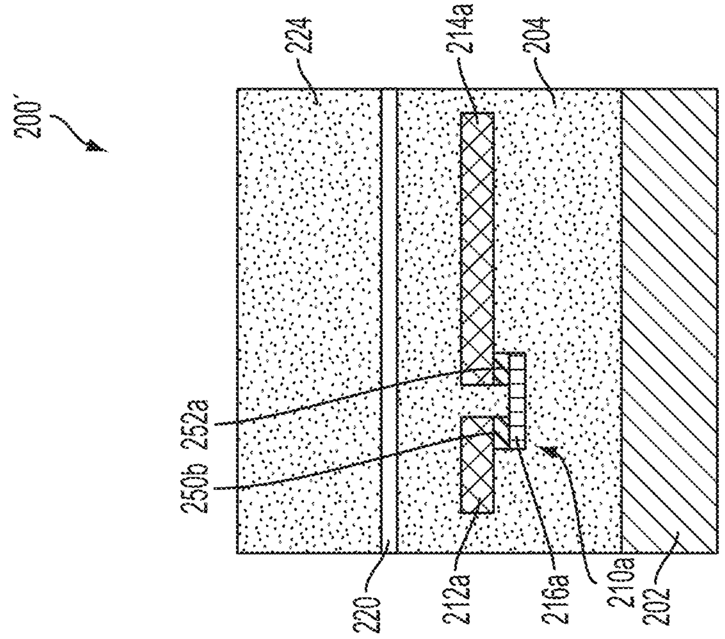
FIG. 2B is a cross sectional view of a slow wave inductor in accordance with one or more embodiments.

FIG. 2B is a cross sectional view of a slow wave inductor 200' in accordance with one or more embodiments. Slow wave inductor 200' is similar to slow wave inductive structure 100 (FIG. 1A). Similar elements have a same reference number increased by 100. In comparison with slow wave inductor 200 (FIG. 2A), slow wave inductor 200' includes a conductive winding 210*a* only in a first IMD layer 204. In some embodiments, a separation between conductive winding 210*a* and second substrate 220 ranges from about 1 μm to about 2 μm.

Figure 3B:
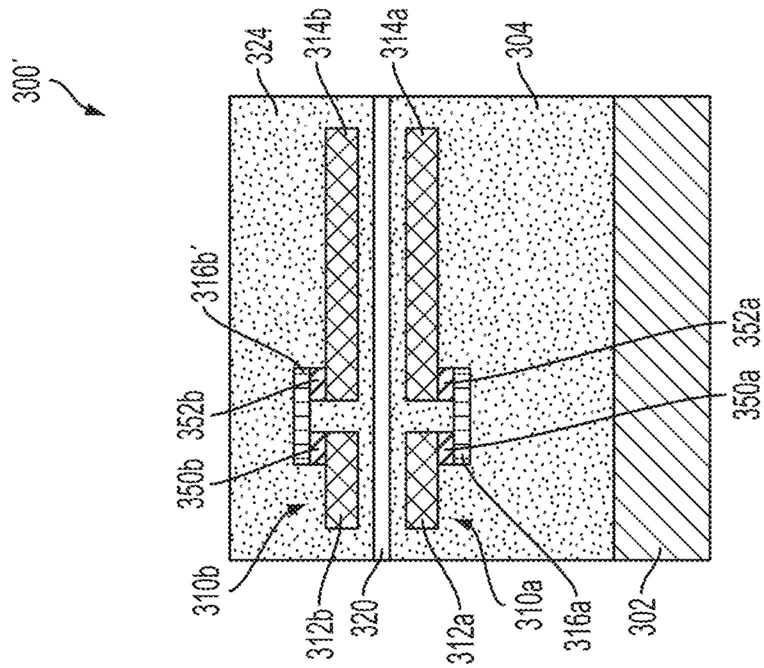
FIG. 3B is a cross sectional view of a slow wave transformer in accordance with one or more embodiments.
Figure 3A:
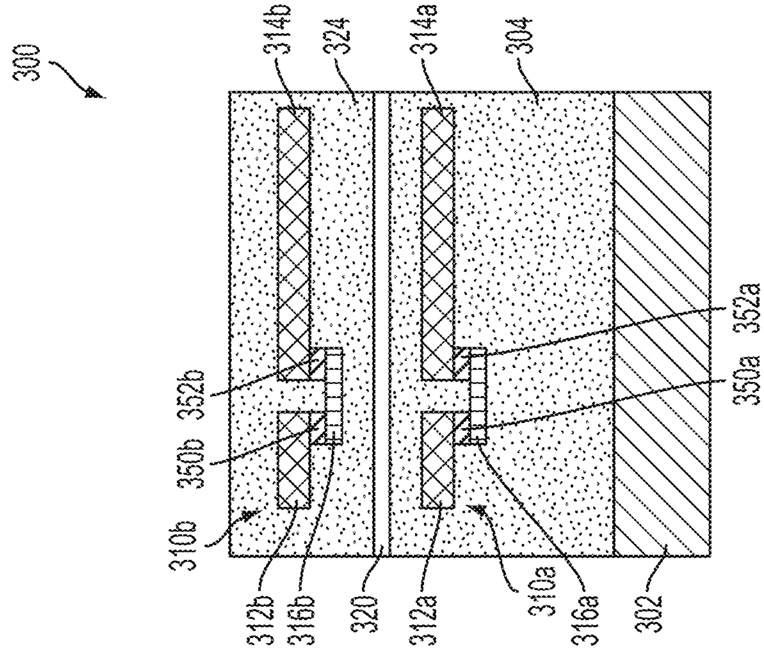
FIG. 3A is a cross sectional view of a slow wave transformer in accordance with one or more embodiments.

FIG. 3A is a cross sectional view of a slow wave transformer 300 in accordance with one or more embodiments. Slow wave transformer 300 is similar to slow wave inductive structure 100 (FIG. 1A). Similar elements have a same reference number increased by 200. Slow wave transformer 300 does not include ILVs providing electrical connections between a first conductive winding 310*a* and a second conductive winding 310*b*. The presence of a second substrate 320 helps to slow a propagation of a wave through first conductive winding 310*a* and second conductive winding 310*b*. In comparison with approaches which do not include second substrate 320, a size of first conductive winding 310*a* and second conductive winding 310*b* is reduced while strength of inductance is maintained. In some embodiments, a separation between first conductive winding 310*a* and second substrate 320 ranges from about 1 μm to about 2 μm. In some embodiments, a separation between second conductive winding 310*b* and second substrate 320 ranges from about 1 μm to about 2 μm. In some embodiments, the separation between second conductive winding 310*b* and second substrate 320 is equal to the separation between first conductive winding 310*a* and the second substrate. In some embodiments, the separation between second conductive winding 310*b* and second substrate 320 is different from the separation between first conductive winding 310*a* and the second substrate.

First conductive winding 310*a* includes a first conductive line 312*a* and a second conductive line 314*a* on a same level of first IMD layer 304. First conductive winding 310*a* further includes a third conductive line 316*a* on a different level of first IMD layer 304. First conductive winding 310*a* further includes a first conductive via 350*a* connecting first conductive line 312*a* to third conductive line 316*a*; and a second conductive via 352*a* connecting second conductive line 314*a* to third conductive line 316*a*.

Second conductive winding 310*b* includes a first conductive line 312*b* and a second conductive line 312*b* on a same level of second IMD layer 324. Second conductive winding 310*b* further includes a third conductive line 316*b* on a different level of second IMD layer 324. Second conductive winding 310*b* further includes a first conductive via 350*b* connecting first conductive line 312*b* to third conductive line 316*b*; and a second conductive via 352*b* connecting second conductive line 314*b* to third conductive line 316*b*. In the arrangement of slow wave transformer 300, third conductive line 316_b_ is closer to second substrate 320 than first conductive line 312_b_ and second conductive line 314_b_.

FIG. 3B is a cross sectional view of a slow wave transformer 300' in accordance with one or more embodiments. Slow wave transformer 300' is similar to slow wave inductive structure 100 (FIG. 1A). Similar elements have a same reference number increased by 200. In comparison with slow wave transformer 300 (FIG. 3A), slow wave transformer 300' includes a third conductive line 316_b_' of second conductive winding 310_b_ farther from second substrate 320 than first conductive line 312_b_ and second conductive line 314_b_ of the second conductive winding.

Figure 4:
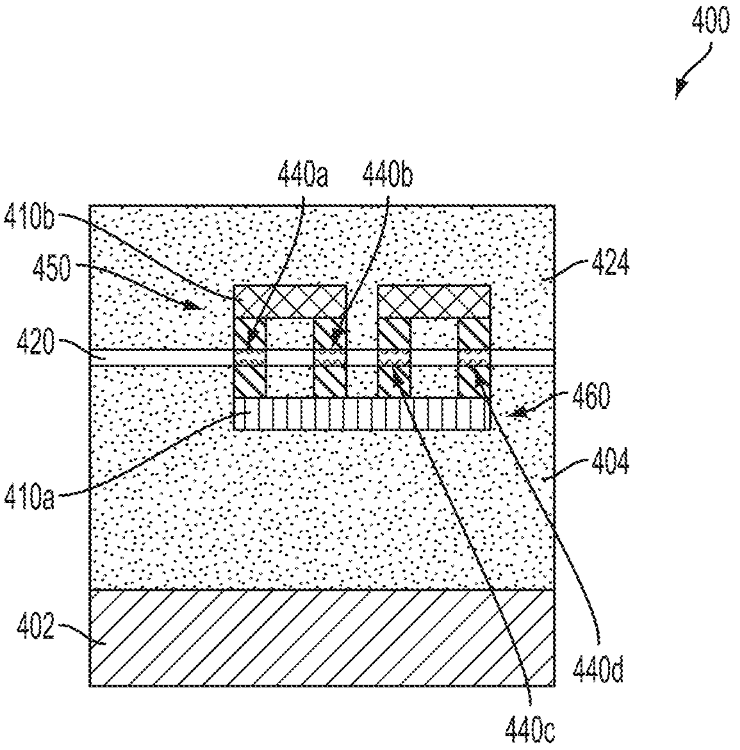
FIG. 4 is a cross sectional view of a slow wave inductor having variable inductance in accordance with one or more embodiments.

FIG. 4 is a cross sectional view of a slow wave inductor 400 having variable inductance in accordance with one or more embodiments. Slow wave inductor 400 is similar to slow wave inductive structure 100 (FIG. 1A). Similar elements have a same reference number increased by 300. Slow wave inductor 400 includes an input port 450 configured to receive an electrical current. Slow wave inductor 400 includes an output port 460 configured to output an electrical current. Slow wave inductor 400 includes a first conductive line connected to input port 450 and a second conductive line connected to output port 460. A first conductive element and a second conductive element selectively connect the first conductive line to the second conductive line. In some embodiments, the first conductive element and the second conductive element are independently selected from metal lines, via, TSVs, ILVs, or other suitable conductive elements. Slow wave inductor 400 further includes a third conductive line in second IMD layer 424. A third conductive element and a fourth conductive element selectively connect the third conductive line to the second conductive line. In some embodiments, the third conductive element and the fourth conductive element are independently selected from metal lines, via, TSVs, ILVs, or other suitable conductive elements. Slow wave inductor 400 includes four switches 440_a_-440_d_ in second substrate 420. Switch 440_a_ is configured to selectively allow electrical connection between the first conductive line and the second conductive line along the first conductive element. Switch 440_b_ is configured to selectively allow electrical connection between the first conductive line and the second conductive line along the second conductive element. Switch 440_c_ is configured to selectively allow electrical connection between the third conductive line and the second conductive line along the third conductive element. Switch 440_d_ is configured to selectively allow electrical connection between the third conductive line and the second conductive line along the fourth conductive element. In some embodiments, slow wave inductor 400 includes more or less than four switches.

By independently activating switches 440_a_-440_d_, a current path through slow wave inductor 400 is adjusted, which facilitates adjusting of an inductance and a Q factor of the slow wave inductor. FIGS. 5A-5E are cross sectional view of current paths of slow wave inductor 400 having variable inductance in accordance with one or more embodiments.

Figure 5A:
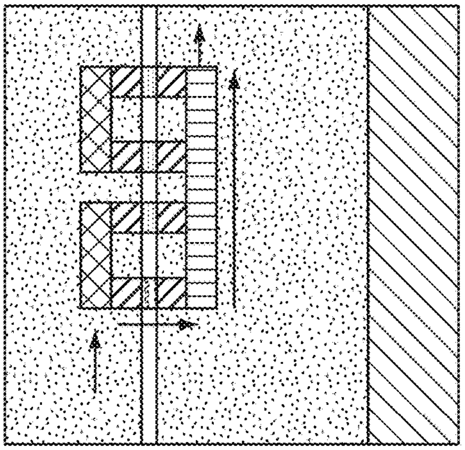
FIGS. 5A-5E are cross sectional view of current paths of a slow wave inductor having variable inductance in accordance with one or more embodiments.

In FIG. 5A, switch 440_a_ is activated permitting a current path from input port 450 through the first conductive element to output port 460.

Figure 5B:
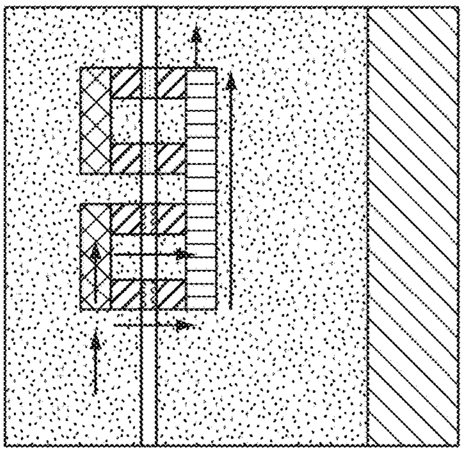

In FIG. 5B, switches 440_a_ and 440_b_ are activated permitting a current path from input port 450 through the first conductive element and the second conductive element to output port 460.

Figure 5C:
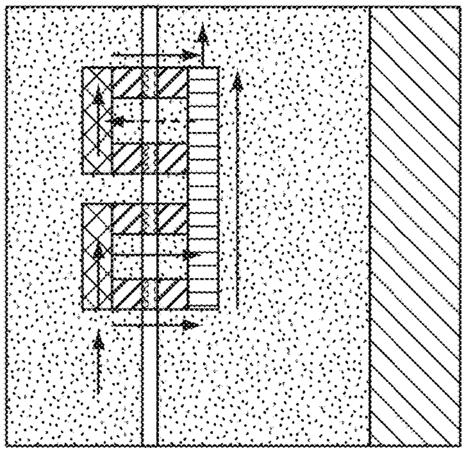

In FIG. 5C, switches 440_a_-440_d_ are activated permitting a current path from input port 450 through each of the first through fourth conductive elements to output port 460. Current traveling along third conductive element through switch 440_c_ creates a negative mutual inductance within slow wave inductor 400. The negative mutual inductance is produced by a magnetic flux generated by current traveling in opposite directions through the third conductive element in comparison with the first conductive element, the second conductive element and the fourth conductive element. Negative mutual inductance reduces an overall inductance of slow wave inductor 400.

Figure 5D:
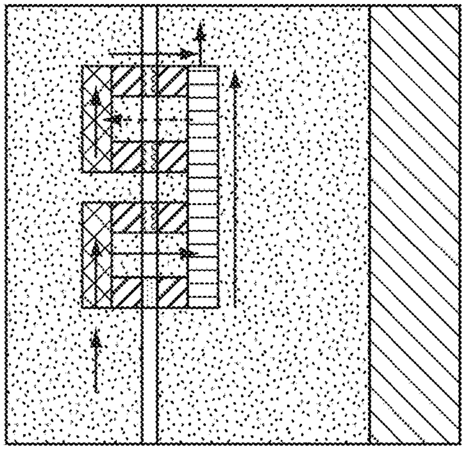

In FIG. 5D, switches 440_b_-440_d_ are activated permitting a current path from input port 450 through the second conductive element, the third conductive element, and the fourth conductive element to output port 460. Current traveling along third conductive element through switch 440_c_ creates negative mutual inductance within slow wave inductor 400.

Figure 5E:
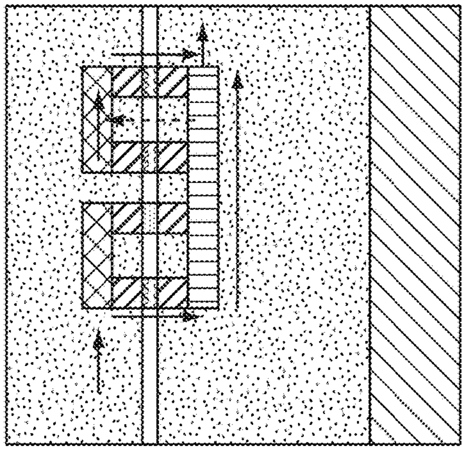

In FIG. 5E, switches 440_a_, 440_c_ and 440_d_ are activated permitting a current path from input port 450 through the first conductive element, the third conductive element, and the fourth conductive element to output port 460. Current traveling along third conductive element through switch 440_c_ creates negative mutual inductance within slow wave inductor 400.

In embodiments where only one of switch 440_c_ or switch 440_d_ is activated, slow wave inductor 400 would include an open stub. An open stub is a conductive line which has an inlet but no outlet. In embodiments, where only one of switch 440_c_ or switch 440_d_ is activated, slow wave inductor 400 would operate similar to a band stop filter by trapping a frequency of the input frequency in the open stub. The frequency trapped in the open stub is based on a length of the open stub.

Figure 6:
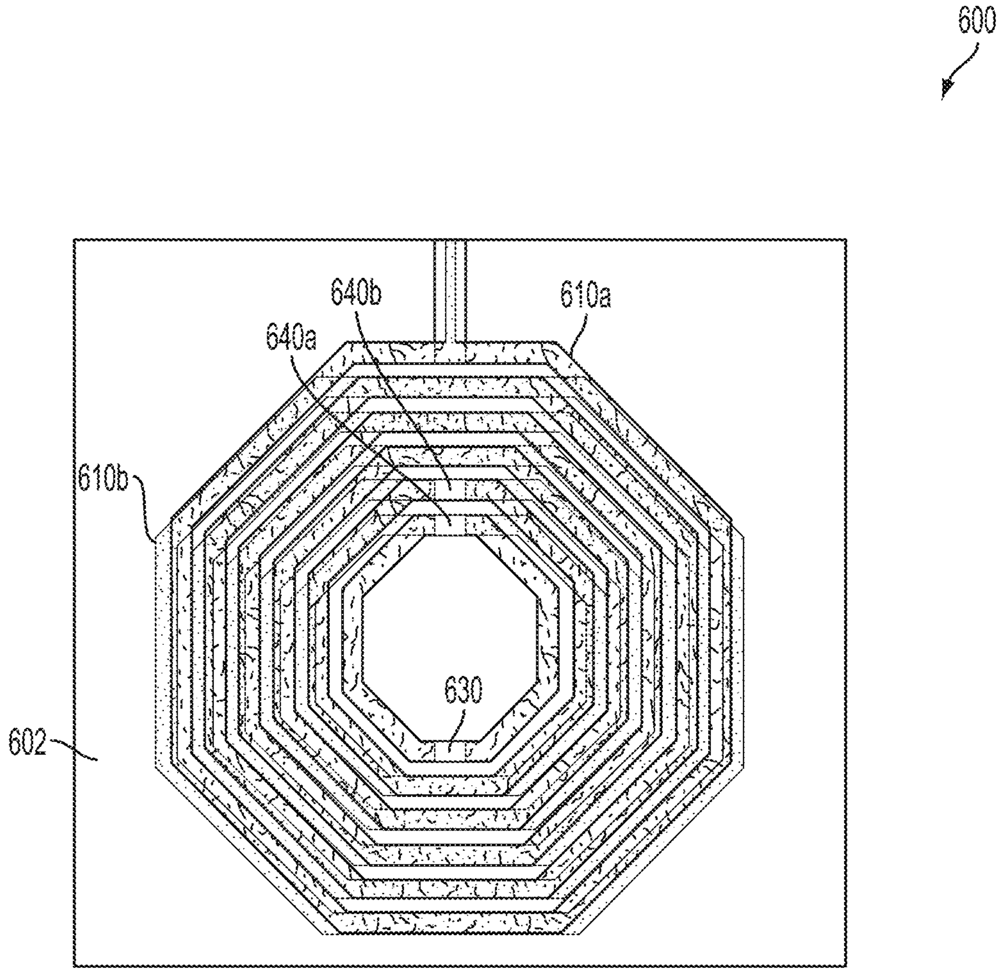
FIG. 6 is a top view of a slow wave inductor having a variable inductance in accordance with one or more embodiments.

FIG. 6 is a top view of a slow wave inductor 600 having a variable inductance in accordance with one or more embodiments. Slow wave inductor 600 is similar to slow wave inductive structure 100 (FIG. 1). Similar elements have a same reference number increased by 500. In comparison with slow wave inductive structure 100, slow wave inductor 600 includes a first switch 640_a_, and a second switch 640_b_, which are configured to selectively connect portions of first conductive winding 610_a_ and second conductive winding 610_b_. In some embodiments, slow wave inductor 600 includes more or less than two switches. In some embodiments, a number of switches and a location of the switches are selected based on performance characteristics of slow wave inductor 600. In some embodiments, the performance characteristics are determined using empirical data. In some embodiments, the performance characteristics are determined using simulation data.

Figure 7A:
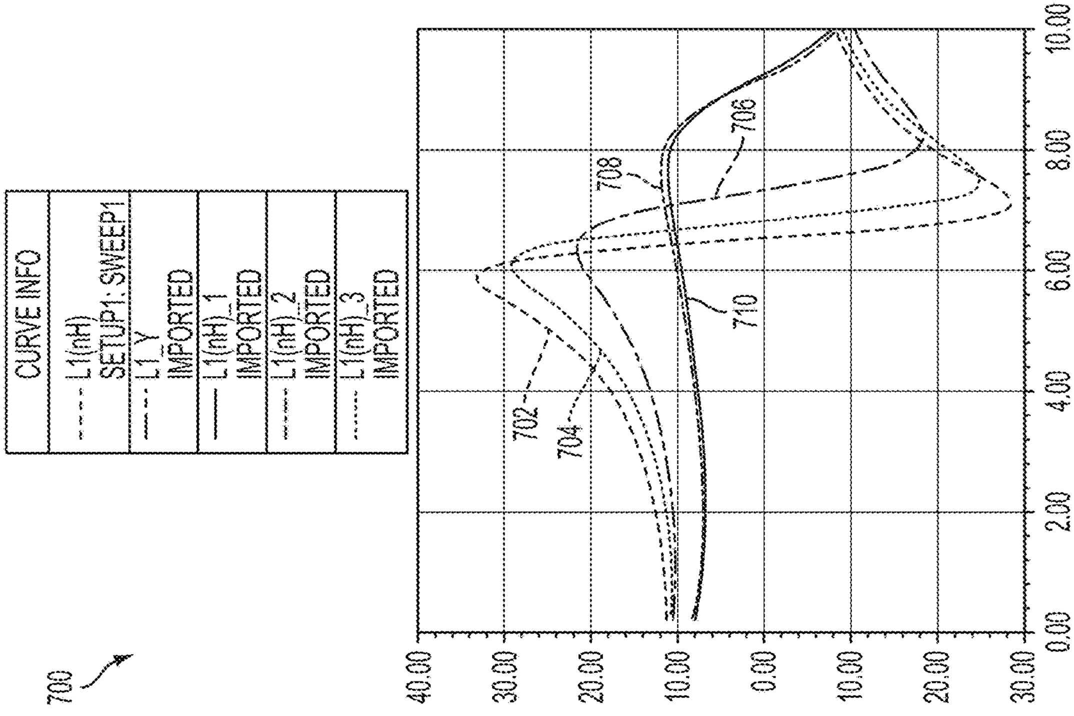
FIG. 7A is a graph of inductance versus frequency for various switching arrangements of the slow wave inductor of FIG. 6 in accordance with one or more embodiments.
Figure 7B:
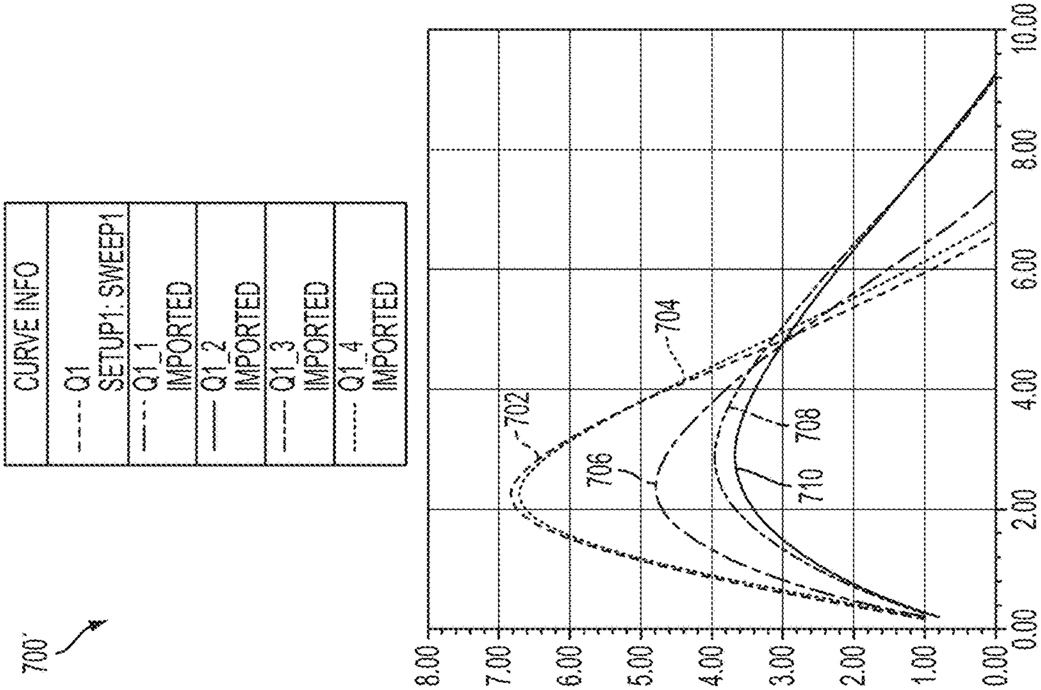
FIG. 7B is a graph of Q factor versus frequency for various switching arrangements of the slow wave inductor of FIG. 6 in accordance with one or more embodiments.

FIG. 7A is a graph 700 of inductance versus input frequency for various switching arrangements of slow wave inductor 600 in accordance with one or more embodiments. FIG. 7B is a graph 700' of Q factor versus input frequency for various switching arrangements of slow wave inductor 600 in accordance with one or more embodiments. Graph 700 and graph 700' include a plot 702 in which switch 640_a_ is activated and switches 640_b_ and 640_c_ are deactivated. Graph 700 and graph 700' include a plot 704 in which switch 640_b_ is activated and switches 640_a_ and 640_c_ are deactivated. Graph 700 and graph 700' include a plot 706 in which switches 640_a_ and 640_b_ are activated and switch 640_c_ is deactivated. Graph 700 and graph 700' include a plot 708 in which switches 640_a_ and 640_c_ are activated and switch 640_b_ is deactivated. Graph 700 and graph 700' include a plot 710 in which switches 640_a_, 640_b_ and 640_c_ are activated.

Different current paths through slow wave inductor 600 provide different levels of inductance, as indicated in graph 700. Inductance is a resistance to a change in current. Graph

700 indicates that plots 702 and 704 provide significant variation in the inductance with respect to an input frequency. Plots 708 and 710, however, indicate a low variation in inductance with respect to the input frequency. Plot 706 indicates a moderate variation in inductance with respect to the input frequency.

Different current paths through slow wave inductor 600 provide different Q factors, as indicated in graph 700'. Q factor is a measure of how efficient an inductor operates. Graph 700' indicates that plots 702 and 704 have a high Q factor in a frequency range from about 1.5 gigaHertz (GHz) to about 4 GHz. Plots 708 and 710, however, indicate an overall low Q factor. Plot 706 indicates a moderate Q factor in a frequency range from about 1.5 GHz to about 4 GHz, but not as high as plots 702 and 704. The inventor believes the difference in Q factor between plot 706 and plots 702 and 704 indicates a portion of slow wave inductor 600 does not provide a significant contribution to the inductance of the slow wave inductor, so passing current through this portion reduces the efficiency of slow wave inductor 600.

Figure 8:
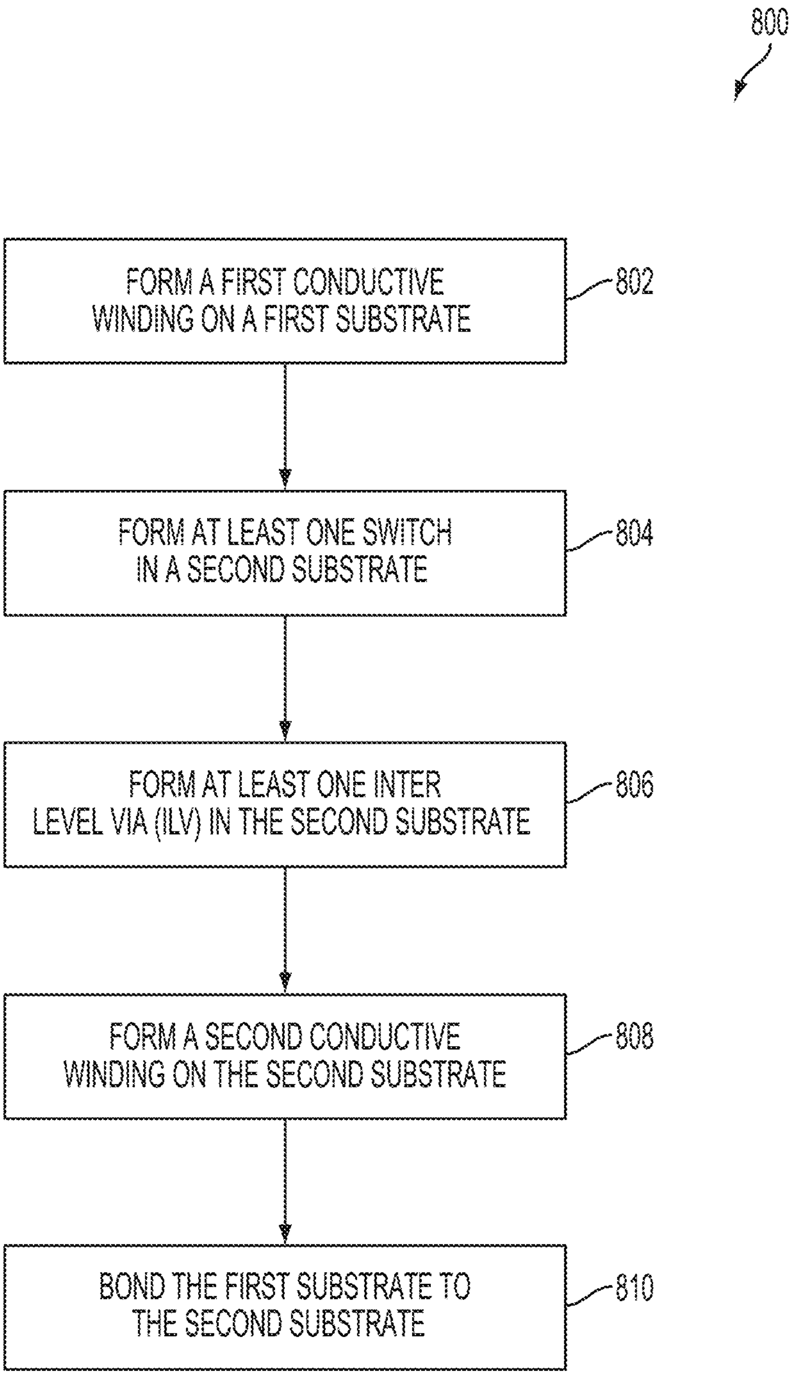
FIG. 8 is a flow chart of a method of making a slow wave inductive structure in accordance with one or more embodiments.

FIG. 8 is a flow chart of a method 800 of making a slow wave inductive structure in accordance with one or more embodiments. Method 800 begins with operation 802 in which a first conductive winding, e.g., first conductive winding 110*a* (FIG. 1A), is formed on a first substrate, e.g., first substrate 102. In some embodiments, the first conductive winding is formed using a combination of photolithography and etching processes to form openings in an IMD layer, e.g., first IMD layer 104. In some embodiments, the photolithography process includes patterning a photoresist, such as a positive photoresist or a negative photoresist. In some embodiments, the photolithography process includes forming a hard mask, an antireflective structure, or another suitable photolithography structure. In some embodiments, the etching process is a wet etching process, a dry etching process, a reactive ion etching (RIE) process, or another suitable etching process. The openings are then filled with conductive material, e.g., copper, aluminum, titanium, nickel, tungsten, or other suitable conductive material. In some embodiments, the openings are filled using chemical vapor deposition (CVD), physical vapor deposition (PVD), sputtering, atomic layer deposition (ALD) or other suitable formation process.

In some embodiments, operation 802 is omitted. Operation 802 is omitted in embodiments which do not include a conductive winding between the first substrate and a second substrate, e.g., slow wave inductor 200 (FIG. 2A).

Method 800 continues with operation 804 in which at least one switch, e.g., switches 140 (FIG. 1A), is formed in the second substrate, e.g., second substrate 120. In some embodiments, the at least one switch is a MOS, BJT, HEMT or another suitable switching element. In some embodiments, the at least on switch is formed through a combination of implantation processes, deposition process and etching processes. In some embodiments, operation 804 is omitted. Operation 804 is omitted in embodiments in which the slow wave inductive structure is a transformer, e.g., slow wave transformer 300 (FIG. 3A); in embodiments where the conductive winding is formed on only one side of the second substrate, e.g., slow wave inductor 200 (FIG. 2A); or in embodiments where slow wave inductor does not include a variable inductance.

Method 800 continues with operation 806 in which at least one conductive line, e.g., conductive line 130 (FIG. 1A), is formed in the second substrate. In some embodiments, the conductive line is formed using a combination of photolithography and etching processes to form openings in the second substrate. In some embodiments, the photolithography process includes patterning a photoresist, such as a positive photoresist or a negative photoresist. In some embodiments, the photolithography process includes forming a hard mask, an antireflective structure, or another suitable photolithography structure. In some embodiments, the etching process is a wet etching process, a dry etching process, an RIE process, or another suitable etching process. The openings are then filled with conductive material, e.g., copper, aluminum, titanium, nickel, tungsten, or other suitable conductive material. In some embodiments, the openings are filled using chemical vapor deposition (CVD), physical vapor deposition (PVD), sputtering, atomic layer deposition (ALD) or other suitable formation process.

In some embodiments, operation 806 is omitted. Operation 806 is omitted in embodiments in which the slow wave inductive structure is a transformer, e.g., slow wave transformer 300 (FIG. 3A); or in embodiments where the conductive winding is formed on only one side of the second substrate, e.g., slow wave inductor 200 (FIG. 2A).

Method 800 continues with operation 808 in which a second conductive winding, e.g., second conductive winding 110*b* (FIG. 1A), is formed in the second substrate. In some embodiments, the second conductive winding is formed using a combination of photolithography and etching processes to form openings in an IMD layer, e.g., second IMD layer 124. In some embodiments, the photolithography process includes patterning a photoresist, such as a positive photoresist or a negative photoresist. In some embodiments, the photolithography process includes forming a hard mask, an antireflective structure, or another suitable photolithography structure. In some embodiments, the etching process is a wet etching process, a dry etching process, an RIE process, or another suitable etching process. The openings are then filled with conductive material, e.g., copper, aluminum, titanium, nickel, tungsten, or other suitable conductive material. In some embodiments, the openings are filled using chemical vapor deposition (CVD), physical vapor deposition (PVD), sputtering, atomic layer deposition (ALD) or other suitable formation process.

In some embodiments, operation 808 is omitted. Operation 808 is omitted in embodiments which include a conductive winding only between the first substrate and a second substrate, e.g., slow wave inductor 200' (FIG. 2B).

Method 800 continues with operation 810 in which the first substrate is bonded to the second substrate. In some embodiments, the first substrate is bonded to the second substrate using a laser bonding process, a conductive adhesive layer, soldering process or another suitable bonding process.

One of ordinary skill in the art would recognize that an order of operations in method 800 is adjustable. One of ordinary skill in the art would further recognize that additional steps are able to be included in method 800 without departing from the scope of this description.

An aspect of this description relates to a method of making a slow wave inductive structure. The method includes depositing a first dielectric layer over a first substrate. The method further includes forming a first conductive winding in the first dielectric layer. The method further includes bonding a second substrate to the first dielectric layer, wherein the second substrate is physically separated from the first conductive winding, and the second substrate has a thickness ranging from about 50 nanometers (nm) to about 150 nm. The method further includes depositing a second dielectric layer over the second substrate. The method further includes forming a second conductive winding in the second dielectric layer, wherein the second substrate is physically separated from the second conductive winding. In some embodiments, the method further includes forming a conductive element in the second substrate, wherein the conductive element electrically connects the first conductive winding to the second conductive winding. In some embodiments, the method further includes forming a switch in the second substrate, wherein the switch selectively connects the first conductive winding to the second conductive winding. In some embodiments, forming the first conductive winding includes forming a first conductive element a first distance from the first substrate; forming a second conductive element a second distance from the first substrate, wherein the first distance is different from the second distance; and electrically connecting the first conductive element and the second conductive element using a via.

An aspect of this description relates to a method of making a slow wave inductive structure. The method includes forming a first conductive winding over a first substrate. The method further includes forming a switch in a second substrate different from the first substrate. The method further includes forming a second conductive winding over the second substrate, wherein the second conductive winding is electrically connected to the switch. The method further includes bonding the second substrate to the first substrate, wherein bonding the second substrate to the first substrate comprises electrically connecting the first conductive winding to the switch. In some embodiments, the method further includes forming an inter-level via (ILV) in the second substrate. In some embodiments, forming the second conductive winding includes electrically connecting the second conductive winding to the ILV. In some embodiments, bonding the second substrate to the first substrate includes electrically connecting the first conductive winding to the ILV. In some embodiments, forming the ILV includes forming the ILV closer to a center of the second conductive winding than the switch. In some embodiments, forming the switch in the second substrate includes forming the switch in the second substrate having a thickness ranging from about 50 nanometers (nm) to about 150 nm. In some embodiments, bonding the second substrate to the first substrate includes bonding the second substrate to the first substrate at a distance ranging from about 1 micron (μm) to about 2 μm from the first conductive winding. In some embodiments, forming the switch includes forming a plurality of switches in the second substrate.

An aspect of this description relates to a method of making a slow wave inductive structure. The method includes forming a first conductive winding over a first substrate. The method further includes forming a switch in a second substrate different from the first substrate. The method further includes forming an inter-level via (ILV) in the second substrate. The method further includes forming a second conductive winding over the second substrate, wherein the second conductive winding comprises a conductive line around a central opening, the switch is electrically connected to the second conductive winding on a first side of the opening, and the ILV is electrically connected to the second conductive winding on a second side of the opening opposite the first side. The method further includes bonding the second substrate to the first substrate. In some embodiments, bonding the second substrate to the first substrate includes electrically connecting the first conductive winding to the switch. In some embodiments, bonding the second substrate to the first substrate includes electrically connecting the first conductive winding to the ILV. In some embodiments, forming the switch in the second substrate includes forming the switch in the second substrate having a thickness ranging from about 50 nanometers (nm) to about 150 nm. In some embodiments, bonding the second substrate to the first substrate includes bonding the second substrate to the first substrate at a distance ranging from about 1 micron (μm) to about 2 μm from the first conductive winding. In some embodiments, forming the switch includes forming a plurality of switches. In some embodiments, forming the first conductive winding includes forming the first conductive winding comprising copper, aluminum, titanium, nickel, or tungsten. In some embodiments, forming the second conductive winding includes forming the second conductive winding comprising forming the second conductive winding comprising a different material from the first conductive winding.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of making a slow wave inductive structure, the method comprising:

depositing a first dielectric layer over a first substrate;

forming a first conductive winding over the first substrate, wherein the first conductive winding is in the first dielectric layer;

bonding a second substrate to the first dielectric layer, wherein the second substrate is physically separated from the first conductive winding, and the second substrate has a thickness ranging from about 50 nanometers (nm) to about 150 nm;

forming a switch in the second substrate, wherein bonding the second substrate comprises electrically connecting the first conductive winding to the switch;

depositing a second dielectric layer over the second substrate; and forming a second conductive winding over the second substrate, wherein the second conductive winding is in the second dielectric layer, the second conductive winding is electrically connected to the switch, the second substrate is physically separated from the second conductive winding, and the second substrate is between the first conductive winding and the second conductive winding.

2. The method of claim 1, further comprising forming a conductive element in the second substrate, wherein the conductive element electrically connects the first conductive winding to the second conductive winding.

3. The method of claim 1, wherein the switch selectively connects the first conductive winding to the second conductive winding.

4. The method of claim 1, wherein forming the first conductive winding comprises:

forming a first conductive element a first distance from the first substrate;

forming a second conductive element a second distance from the first substrate, wherein the first distance is different from the second distance; and electrically connecting the first conductive element and the second conductive element using a via.

5. A method of making a slow wave inductive structure, the method comprising:

forming a first conductive winding over a first substrate;

forming a switch in a second substrate different from the first substrate;

forming a second conductive winding over the second substrate, wherein the second conductive winding is electrically connected to the switch, and the second substrate is between the first conductive winding and the second conductive winding; and bonding the second substrate to the first substrate, wherein bonding the second substrate to the first substrate comprises electrically connecting the first conductive winding to the switch.

6. The method of claim 5, further comprising forming an inter-level via (ILV) in the second substrate.

7. The method of claim 6, wherein forming the second conductive winding comprises electrically connecting the second conductive winding to the ILV.

8. The method of claim 6, wherein bonding the second substrate to the first substrate comprises electrically connecting the first conductive winding to the ILV.

9. The method of claim 6, wherein forming the ILV comprises forming the ILV closer to a center of the second conductive winding than the switch.

10. The method of claim 5, wherein forming the switch in the second substrate comprises forming the switch in the second substrate having a thickness ranging from about 50 nanometers (nm) to about 150 nm.

11. The method of claim 5, wherein bonding the second substrate to the first substrate comprises bonding the second substrate to the first substrate at a distance ranging from about 1 micron (μm) to about 2 μm from the first conductive winding.

12. The method of claim 5, wherein forming the switch comprises forming a plurality of switches in the second substrate.

13. A method of making a slow wave inductive structure, the method comprising:

forming a first conductive winding over a first substrate;

forming a switch in a second substrate different from the first substrate;

forming an inter-level via (ILV) in the second substrate;

forming a second conductive winding over the second substrate, wherein the second conductive winding comprises a conductive line around a central opening, the switch is electrically connected to the second conductive winding on a first side of the opening, and the ILV is electrically connected to the second conductive winding on a second side of the opening opposite the first side; and bonding the second substrate to the first substrate, wherein bonding the second substrate comprises electrically connecting the first conductive winding to the switch.

14. The method of claim 13, wherein the switch selectively connects the second conductive winding to the first conductive winding.

15. The method of claim 13, wherein bonding the second substrate to the first substrate comprises electrically connecting the first conductive winding to the ILV.

16. The method of claim 13, wherein forming the switch in the second substrate comprises forming the switch in the second substrate having a thickness ranging from about 50 nanometers (nm) to about 150 nm.

17. The method of claim 13, wherein bonding the second substrate to the first substrate comprises bonding the second substrate to the first substrate at a distance ranging from about 1 micron (μm) to about 2 μm from the first conductive winding.

18. The method of claim 13, wherein forming the switch comprises forming a plurality of switches.

19. The method of claim 13, wherein forming the first conductive winding comprises forming the first conductive winding comprising copper, aluminum, titanium, nickel, or tungsten.

20. The method of claim 13, wherein forming the second conductive winding comprises forming the second conductive winding comprising forming the second conductive winding comprising a different material from the first conductive winding.

* * * * *